(12) United States Patent
Yang et al.

(10) Patent No.: US 9,979,043 B2
(45) Date of Patent: May 22, 2018

(54) THREE DIMENSIONAL SECONDARY BATTERY INCLUDING ELASTIC MEMBER AND METHOD OF FABRICATING THE SAME

(71) Applicant: Samsung Electronics Co., Ltd., Suwon-si, Gyeonggi-do (KR)

(72) Inventors: Hojung Yang, Suwon-si (KR); Jinseok Heo, Hwaseong-si (KR); Hwiyeol Park, Ansan-si (KR); Kyunghoon Cho, Suwon-si (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 203 days.

(21) Appl. No.: 14/982,748

(22) Filed: Dec. 29, 2015

(65) Prior Publication Data

US 2016/0204477 A1 Jul. 14, 2016

(30) Foreign Application Priority Data

Jan. 12, 2015 (KR) ........................ 10-2015-0004458

(51) Int. Cl.
*H01M 10/04* (2006.01)
*H01M 4/48* (2010.01)
(Continued)

(52) U.S. Cl.
CPC ............. *H01M 10/04* (2013.01); *H01M 4/48* (2013.01); *H01M 4/668* (2013.01); *H01M 10/052* (2013.01)

(58) Field of Classification Search
CPC ......... H01M 10/0436; H01M 10/0472; H01M 10/481
See application file for complete search history.

(56) References Cited

U.S. PATENT DOCUMENTS 6,495,283 B1 12/2002 Yoon et al.
7,553,584 B2 6/2009 Chiang et al.
(Continued)

FOREIGN PATENT DOCUMENTS

JP 2011070788 A 4/2011
KR 1020110112067 A 10/2011
(Continued)

OTHER PUBLICATIONS

Neudecker, et al., "Lithium-Free" Thin-Film Battery with In Situ Plated Li Anode, Journal of The Electrochemical Society 147 (2) pp. 517-523 (2000).

*Primary Examiner* — Gregg Cantelmo
(74) *Attorney, Agent, or Firm* — Cantor Colburn LLP

(57) ABSTRACT

A three dimensional ("3D") secondary battery includes an electrolyte layer and an anode active material layer that are sequentially stacked on a plurality of first trenches that are provided in a cathode active material layer where, in the anode active material layer, a plurality of second trenches having similar shape to that of the first trenches is provided and the plurality of second trenches are filled with an elastic member and where the elastic member absorbs expansion of the anode active material layer during charging and discharging the 3D secondary battery, and thus, the degradation of the 3-dimensional secondary battery is prevented.

20 Claims, 10 Drawing Sheets

(51) Int. Cl.
*H01M 4/66* (2006.01)
*H01M 10/052* (2010.01)

(56) References Cited

U.S. PATENT DOCUMENTS

| | | | |
|---|---|---|---|
| 7,682,733 B2* | 3/2010 | Eisenbeiser | H01M 2/0267 29/623.5 |
| 8,192,788 B1* | 6/2012 | Shah | C23C 18/1692 427/115 |
| 2006/0154141 A1* | 7/2006 | Salot | H01M 4/0423 429/149 |
| 2011/0070479 A1 | 3/2011 | Matsuda et al. | |
| 2013/0149605 A1 | 6/2013 | Kakehata et al. | |
| 2013/0260183 A1* | 10/2013 | Ellis-Monaghan | H01M 2/22 429/7 |
| 2014/0038028 A1* | 2/2014 | Genard | H01M 10/0436 429/152 |
| 2014/0162140 A1 | 6/2014 | Hoshiba et al. | |
| 2014/0335395 A1* | 11/2014 | Ramasubramanian | H01M 2/16 429/142 |
| 2015/0280276 A1* | 10/2015 | Lemke | G06F 1/1635 361/679.55 |
| 2016/0204464 A1 | 7/2016 | Cho et al. | |

FOREIGN PATENT DOCUMENTS

| | | | | |
|---|---|---|---|---|
| KR | 1020130064019 A | 6/2013 | | |
| KR | 1020140074181 A | 6/2014 | | |
| WO | WO-2008030215 A2 * | 3/2008 | | H01M 4/0421 |
| WO | WO-2010007579 A1 * | 1/2010 | | H01M 4/13 |

* cited by examiner

THREE DIMENSIONAL SECONDARY BATTERY INCLUDING ELASTIC MEMBER AND METHOD OF FABRICATING THE SAME

CROSS-REFERENCE TO RELATED APPLICATION

This application claims priority to Korean Patent Application No. 10-2015-0004458, filed on Jan. 12, 2015, and all the benefits accruing therefrom under 35 U.S.C. § 119, the content of which in its entirety is herein incorporated by reference.

BACKGROUND

1. Field

Embodiments relate to a three dimensional ("3D") secondary battery including an elastic member that absorbs expansion of an anode active material layer when charging the 3D secondary battery and a method of fabricating the 3D secondary battery.

2. Description of the Related Art

A demand for lithium secondary batteries is rapidly increasing due to the development of mobile information terminals, such as smart phones, notebooks, and personal computers ("PCs") and next generation clean energy vehicles, such as electrical vehicles ("EVs").

An anode of a lithium secondary battery includes an active material layer disposed on a surface of a current collector. Graphite is a material from which ions that became carriers (referred to as carrier ions) may be inserted and deserted, and has been used as an anode active material.

When silicon, silicon doped with phosphorus, or lithium is used as the anode active material in a lithium secondary battery, an insertion amount of carrier ions is increased when compared to a case that carbon is used as the anode active material and a charge capacity is increased when compared to a case that a carbon (graphite) anode is used. However, a large volume change is accompanied according to the insertion and desertion of the carrier ions during charging and discharging cycles, and thus, characteristics of the lithium secondary battery may be degraded.

In a 3-dimensional ("3D") secondary battery, a charge capacity per unit area may be increased by increasing a facing area between a cathode active material layer and an anode active material layer by forming the cathode active material layer and the anode active material layer in a height direction.

SUMMARY

When compared to a lithium secondary battery according to related art, the three dimensional ("3D") secondary battery may further be readily degraded due to deformation caused by an expansion of the anode in the 3D secondary battery.

Provided is a 3D secondary battery having elastic members that mitigate the expansion of an anode active material layer.

Provided is a method of manufacturing the 3D secondary battery.

Additional exemplary embodiments will be set forth in part in the description which follows and, in part, will be apparent from the description, or may be learned by practice of the presented exemplary embodiments.

According to an exemplary embodiment, a 3D secondary battery includes a cathode collector, a cathode active material layer on an upper surface of the cathode collector, the cathode active material layer including a plurality of first trenches on an upper surface thereof, an electrolyte layer covering the upper surface of the cathode active material layer and an exposed surface of the cathode active material layer by the plurality of first trenches, an anode active material layer on the electrolyte layer, the anode active material layer including a plurality of second trenches corresponding to the plurality of first trenches, a plurality of elastic members, each filling respective one of the plurality of second trenches, and an anode collector covering the anode active material layer and the plurality of elastic members.

In an embodiment, the elastic members may include at least one of styrene-butadiene rubber ("SBR"), butadiene rubber ("BR"), isoprene rubber ("IR"), ethylene propylene diene monomer ("EPDM") rubber, silicone rubber, alkyl acrylate copolymer ("ACM"), styrene-butadiene copolymer ("SBS"), styrene-ethylene-butadiene-styrene copolymer ("SEBS"), polymethylsilane rubber, and butyl acrylate copolymer.

In an embodiment, the elastic members may include a conduction agent.

In an embodiment, the conduction agent may include at least one of carbon black and carbon nanotubes.

In an embodiment, the anode active material layer may include at least one of lithium metal, silicon, tin, aluminum, and germanium.

In an embodiment, the cathode active material layer may further include a plurality of third trenches disposed on a surface facing the cathode collector, and a plurality of second elastic members that fill the third trenches.

In an embodiment, the first trenches and the third trenches may be alternately provided and are parallel to each other when viewed from a plan view.

According to another exemplary embodiment, a 3D secondary battery includes a cathode collector, a plurality of cathode active material plates disposed perpendicular to the cathode collector, an electrolyte layer on the cathode collector to cover the plurality of cathode active material plates, a plurality of anode active material layer, each covering the electrolyte layer between adjacent cathode active material plates to form corresponding one of a plurality of first trenches, a plurality of elastic members, each filling respective one of the plurality of first trenches, and an anode collector that covers the anode active material layer and the elastic members.

In an embodiment, the cathode active material plates may further include a plurality of second trenches disposed on a surface facing the cathode collector, and a plurality of second elastic members that fill the second trenches.

According to another exemplary embodiment, a method of manufacturing a 3D secondary battery, the method includes preparing a cathode collector, forming a cathode active material layer on the cathode collector, forming a plurality of first trenches on an upper surface of the cathode active material layer, sequentially forming an electrolyte layer and an anode active material layer in the first trenches and on the cathode active material layer to form a plurality of second trenches in the anode active material layer, each of the plurality of second trenches corresponding to respective one of the plurality of first trenches, filling each of the plurality of second trenches with respective one of the plurality of elastic members, and forming an anode collector on the anode active material layer to cover the plurality of elastic members.

In an embodiment, the filling of the second trenches with the elastic member may include filling the second trenches with a monomer, and polymerizing the monomer.

In an embodiment, the filling of the second trenches with a monomer may further include adding at least one of an initiator, a catalyst, and a radical to the monomer.

In an embodiment, the filling of the second trenches with a monomer may further include adding a conduction agent to the monomer.

BRIEF DESCRIPTION OF THE DRAWINGS

These and/or other exemplary embodiments will become apparent and more readily appreciated from the following description of the exemplary embodiments, taken in conjunction with the accompanying drawings in which.

DETAILED DESCRIPTION

Figure 1:
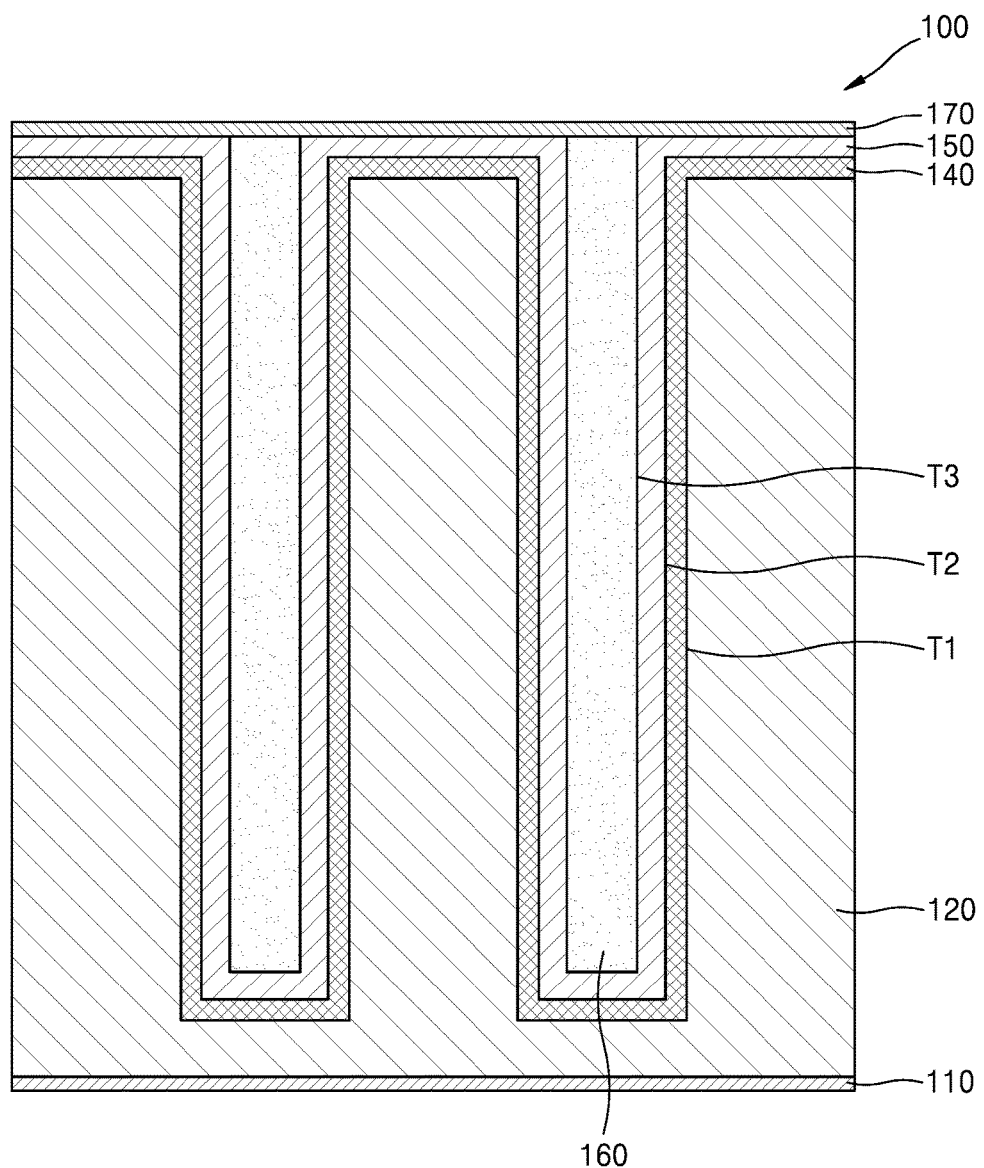
FIG. 1 is a cross-sectional view illustrating an exemplary embodiment of a structure of a three dimensional ("3D") secondary battery having an elastic member.

Reference will now be made in detail to exemplary embodiments, examples of which are illustrated in the accompanying drawings. In the drawings, the thicknesses of layers and regions are exaggerated for clarity. The embodiments described below are exemplary, and thus, may be embodied in many different forms. It will be understood that when an element or layer is referred to as being "on" another element or layer, the element or layer may be directly on another element or layer or intervening elements or layers. Also, in the drawings, like reference numerals refer to like elements throughout, and the descriptions there of will not be repeated.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
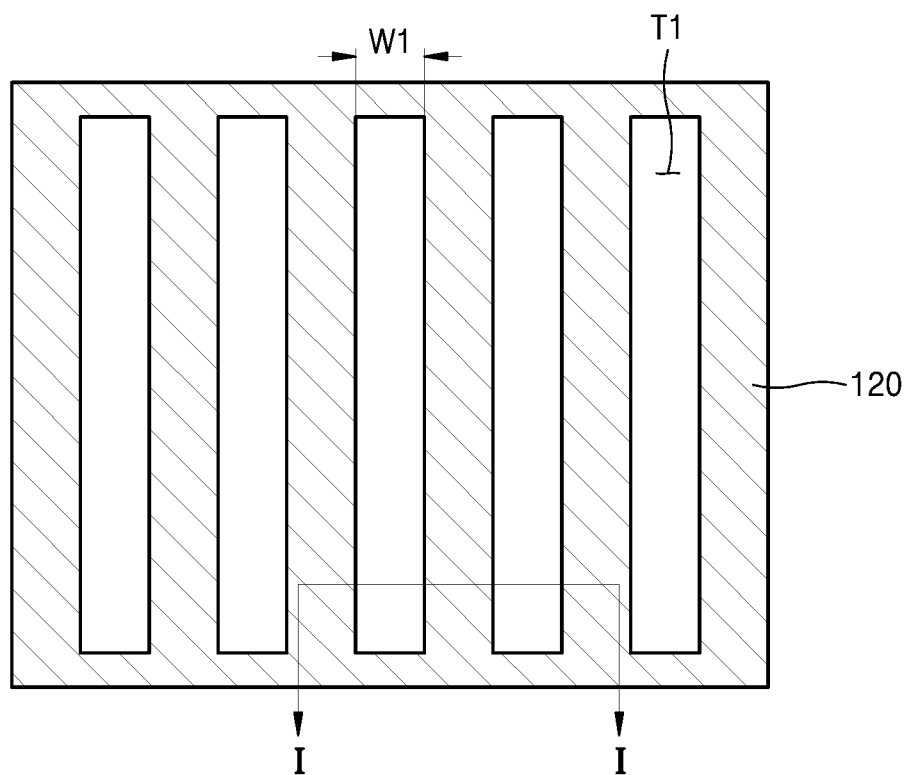
FIG. 2 is a plan view of an exemplary embodiment of a structure of a cathode active material layer of a 3D secondary battery having an elastic member.

FIG. 1 is a cross-sectional view illustrating a structure of a three dimensional ("3D") secondary battery 100 including an elastic member according to an exemplary embodiment. FIG. 2 is a plan view of a structure of a cathode active material layer of a 3D secondary battery 100 including an elastic member according to an exemplary embodiment. FIG. 1 is a cross sectional view taken along I-I of FIG. 2.

Referring to FIGS. 1 and 2, a cathode active material layer 120 is disposed on a cathode collector 110. In an exemplary embodiment, the cathode active material layer 120 may have a width in a range from about 2 micrometers (μm) to about 50 μm and a height in a range from about 40 μm to about 500 μm, for example. A plurality of first trenches T1 is defined in the cathode active material layer 120. In an exemplary embodiment, the first trenches T1 may have a first width W1 in a range from about 10 μm to about 50 μm, for example. The first trenches T1 may be disposed parallel to each other when viewed from a plan view.

An electrolyte layer 140 may be disposed on the cathode active material layer 120 to cover the first trenches T1. Second trenches T2 having a similar shape to that of the first trenches T1 may be defined in the electrolyte layer 140. The electrolyte layer 140 may cover upper surfaces of the cathode active material layer 120 and surfaces of the cathode active material layer 120 that are exposed by the first trenches T1. In an exemplary embodiment, the electrolyte layer 140 may include a solid electrolyte. In an exemplary embodiment, the electrolyte layer 140 may be provided to a thickness in a range from about 1 μm to about 5 μm, for example.

An anode active material layer 150 may be disposed on the electrolyte layer 140. Third trenches T3 having a similar shape to that of the second trenches T2 may be defined in the anode active material layer 150.

In FIG. 2, the first trenches T1 are in a closed state where the first trenches T1 is surrounded by the cathode active material layer 120. However, the exemplary embodiment is not limited thereto, that is, at least one edge of the first trenches T1 may be in an exposed state where the at least one edge of the first trenched T1 is exposed to the air. When the at least one edge of the first trenches T1 is exposed, the second trenches T2 and the third trenches T3 may also be exposed trenches.

An elastic member 160 that may absorb expansion of the anode active material layer 150 may fill the third trenches T3. The elastic member 160 may include an elastic material. In an exemplary embodiment, the elastic member 160 may include a polymer or rubber having elasticity, for example. In an exemplary embodiment, a conduction agent, such as carbon black, VGCF™, or carbon nanotube may be impregnated in the elastic member 160. The conduction agent may increase a conductivity of the elastic member 160.

An anode collector 170 that covers the elastic member 160 may be disposed on the anode active material layer 150.

The cathode collector 110 may include a highly conductive material. In an exemplary embodiment, the cathode collector 110 may include a metal, such as stainless steel, gold, platinum, silver, zinc, iron, copper, titanium, nickel, palladium, or an alloy of these metals. In an exemplary embodiment, the cathode collector 110 may include an aluminum alloy to which an element that increases thermal resistance, for example, silicon, titanium, neodymium, scandium, or molybdenum.

In an exemplary embodiment, the cathode active material layer 120 may include a cathode active material, a binder, and a conduction agent. In an exemplary embodiment, t cathode active material layer 120 of a lithium secondary battery may include a material that reversibly insert and desert lithium ions.

In an exemplary embodiment, the cathode active material may include a lithium transition metal oxide, such as, $LiCoO_2$, $LiNiO_2$, $LiNi-CoO_2$, $LiNi-Co-AlO_2$, $LiNi-Co-MnO_2$, $LiMnO_2$, or $LiFePO_4$, nickel sulfide, copper sulfide, sulfur, iron oxide, and vanadium oxide.

In an exemplary embodiment, the conduction agent may include a carbon group conduction agent, such as carbon black, carbon fiber, and graphite, a conductive fiber, such as a metal fiber, a metal powder, such as fluorine carbon powder, aluminum powder, and nickel powder, a conductive whisker, such as zinc oxide and potassium titanate, a conductive metal oxide, such as titanium oxide, and a conductive polymer, such as a polyphenylene derivative.

In an exemplary embodiment, the electrolyte layer 140 may be provided by using a physical vapor deposition method or a chemical vapor deposition method, for example. In an exemplary embodiment, the electrolyte layer 140 may include a solid electrolyte, for example, lithium phosphorous oxynitride (LiPON). In an exemplary embodiment, the electrolyte layer 140 may include a solid electrolyte, such as, a sulfide group and a garnet group.

In an exemplary embodiment, the anode active material layer 150 may include an anode active material, a binder, and a conduction agent. In an exemplary embodiment, the anode active material layer 150 in a lithium secondary battery may include a material that may form an alloy with lithium or a material in which a reversible insertion and desertion of lithium is possible.

In an exemplary embodiment, the anode active material may include silicon, germanium, a metal, a carbon group material, a metal oxide, and a lithium metal nitride, for example. In an exemplary embodiment, the metal may include at least one of lithium, magnesium, calcium, aluminum, tin, lead, arsenic, antimony, bismuth, silver, gold, zinc, cadmium, mercury, copper, iron, cobalt, and indium, for example.

In an exemplary embodiment, the carbon group material may include at least one of graphite, a graphite carbon fiber, mesocarbon microbeads ("MCMB"), polyacene, a pitch group carbon fiber, and hard carbon, for example.

In an exemplary embodiment, the metal oxide may include at least one of lithium titanate, titan oxide, molybdenum oxide, niobium oxide, iron oxide, tungsten oxide, tin oxide, amorphous tin composite oxide, silicon monooxide, cobalt oxide, and nickel oxide, for example. The binder and the conduction agent included in the anode active material layer 150 may be the same as the binder and the conduction agent included in the cathode active material layer 120.

In an exemplary embodiment, the anode active material layer 150 may have a thickness in a range from about 50 nanometers (nm) to about 15 μm, for example. When the anode active material layer 150 has a thickness less than 50 nm, a stable interface between an anode and an electrolyte may not be provided, and as a result, charge and discharge may not be uniformly occurred, thereby reducing the lifetime characteristic of the anode active material layer 150.

When the anode active material layer 150 has a thickness greater than 15 μm, the capacity of the lithium secondary battery may be reduced.

In an exemplary embodiment, the anode collector 170 may have a foil shape. In an exemplary embodiment, the anode collector 170 may include at least one of copper, stainless steel, nickel, aluminum, and titanium. In an exemplary embodiment, the anode active material layer 150 may include at least one of a binder and a conduction agent. The anode active material layer 150 in a lithium secondary battery may include a material that may form an alloy with lithium or a material in which a reversible insertion and desertion of lithium is possible.

In the 3D secondary battery 100, the contact area between electrodes and the electrolyte layer 140 is increased by using trenches, and therefore, the current density and the charge density of the 3D secondary battery 100 are increased.

In the 3D secondary battery 100, the anode active material layer 150 has a volume expansion during a charging process. At this point, the elastic member 160 may prevent deformation of the 3D secondary battery 100 by being condensed due to the anode active material layer 150.

Figure 3:
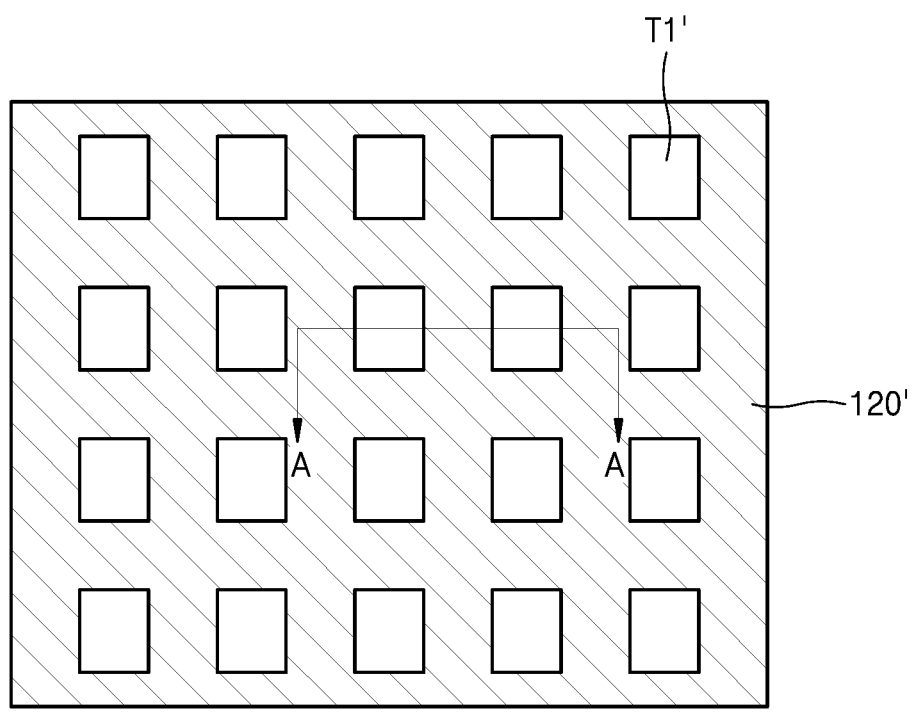
FIG. 3 is a modified plan view of the cathode active material layer of FIG. 1.

FIG. 3 is a modified plan view of the cathode active material layer of FIG. 1. Like reference numerals are used to indicate elements that are substantially identical to the elements of FIG. 1, and thus the detailed description thereof will not be repeated.

Referring to FIG. 3, a plurality of first trenches T1' are 2 dimensionally defined in a cathode active material layer 120'. In FIG. 3, the first trenches T1' have approximately a rectangular shape, but the exemplary embodiment is not limited thereto. In another exemplary embodiment, the first trenches T1' may have a circular shape, for example.

In FIG. 3, the first trenches T1' are disposed in a matrix shape, but the exemplary embodiment is not limited thereto. In an exemplary embodiment, the first trenches T1' may be disposed in a zigzag shape.

The cross-sectional view taken along line A-A of FIG. 3 may be the same as the cross-sectional view of FIG. 1.

Figure 4:
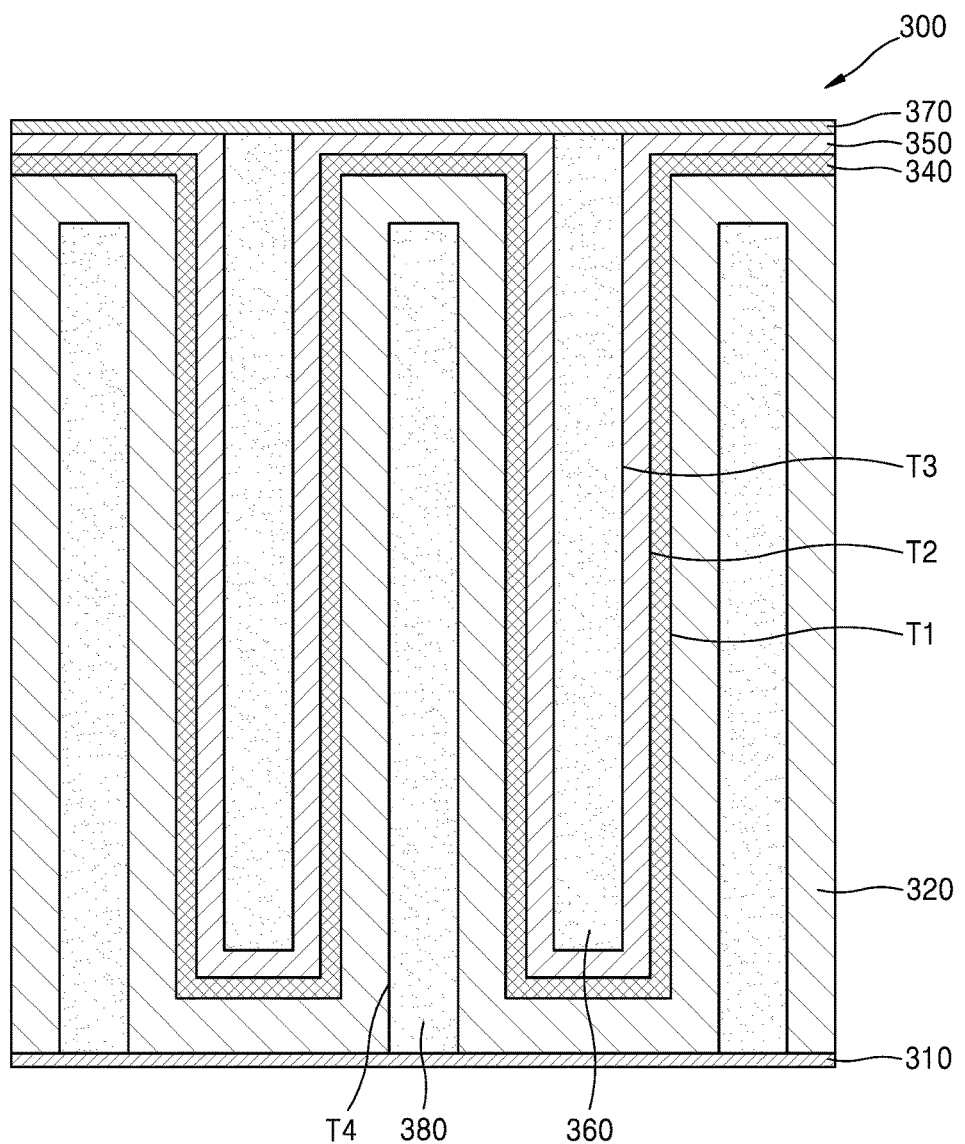
FIG. 4 is a cross-sectional view illustrating a structure of an exemplary embodiment of a 3D secondary battery having elastic members.
Figure 5:
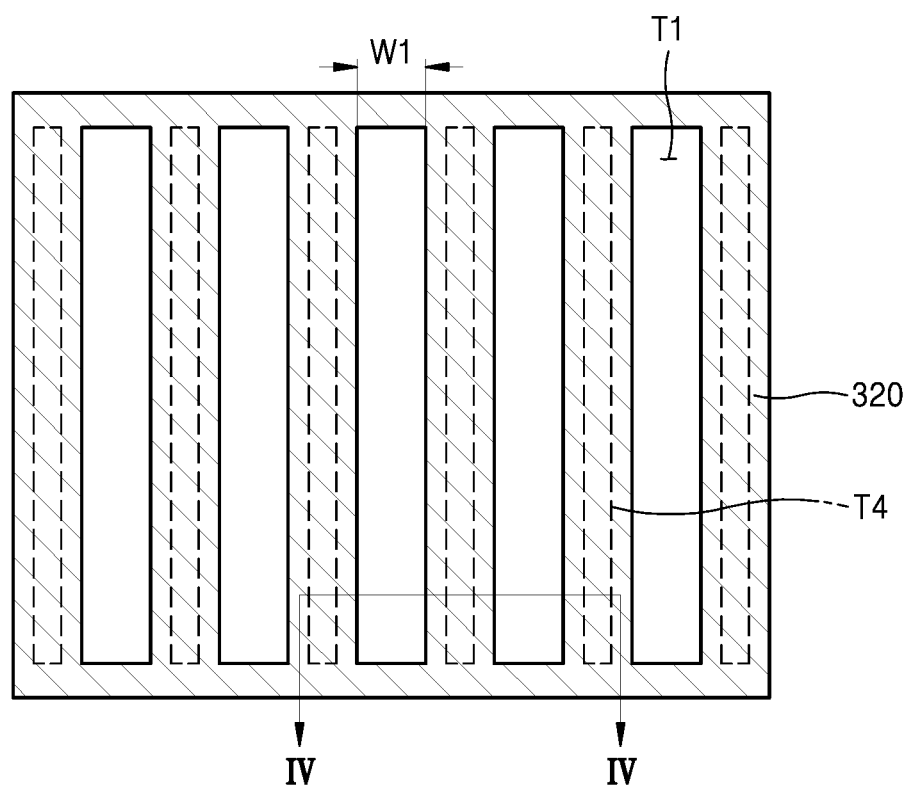
FIG. 5 is a plan view illustrating a structure of an exemplary embodiment of a cathode active material layer of a 3D secondary battery having elastic members.

FIG. 4 is a cross-sectional view illustrating a structure of a 3D secondary battery 300 including a first elastic member 360 and a second elastic member 380 according to an exemplary embodiment. FIG. 5 is a plan view of the 3D secondary battery 300. FIG. 4 is a cross-sectional view taken along line IV-IV of FIG. 5. Like reference numerals are used to indicate elements that are substantially identical to the elements of FIG. 1, and the detailed description thereof will not be repeated. Here, the structure difference from that of FIG. 1 will be mainly described.

Referring to FIGS. 4 and 5, a cathode active material layer 320 is disposed on a cathode collector 310. A plurality of first trenches T1 is defined in the cathode active material layer 320. In an exemplary embodiment, the first trenches T1 may have a first width W1 in a range from about 10 μm to about 50 μm, for example. The first trenches T1 may be disposed parallel to each other when viewed from a plan view.

A plurality of fourth trenches T4 may further be provided in the cathode active material layer 320. The fourth trenches T4 may be disposed parallel to each other when viewed from a plan view. In the plan view, the first trenches T1 and the fourth trenches T4 may be alternately disposed. The fourth trenches T4 may have a horizontal width smaller than the first width W1 of the first trenches T1.

An electrolyte layer 340 that covers the first trenches T1 may be disposed on the cathode active material layer 320. Second trenches T2 having similar shape to that of the first trenches T1 may be defined in the electrolyte layer 340. The electrolyte layer 340 may cover upper surfaces of the cathode active material layer 320 and surfaces of the cathode active material layer 320 that are exposed by the first trenches T1. In an exemplary embodiment, the electrolyte layer 340 may include a solid electrolyte, for example. In an exemplary embodiment, the electrolyte layer 340 may be provided to a thickness in a range from about 1 μm to about 5 μm, for example.

In an exemplary embodiment, an anode active material layer 350 may be disposed on the electrolyte layer 340 to a thickness in a range from about 50 nm to about 15 μm, for example. Third trenches T3 having similar shape to that of the second trenches T2 may be defined in the anode active material layer 350.

The first elastic member 360 that absorbs expansion of the anode active material layer 350 may fill the third trenches T3 of the anode active material layer 350. In an exemplary embodiment, the first elastic member 360 may include an elastic material, for example, a polymer or rubber. In an exemplary embodiment, a conduction agent, such as carbon black, VGCF™, or carbon nanotube may be impregnated in the first elastic member 360. The conduction agent may increase conductivity of the elastic member 360.

The second elastic member 380 may be provided in the fourth trenches T4. The second elastic member 380 may absorb the expansion of the anode active material layer 350. The second elastic member 380 may include the same material used to form the first elastic member 360, and thus, the description thereof will not be repeated.

In FIG. 5, the first trenches T1 and the fourth trenches T4 are in a closed state, but the exemplary embodiment is not limited thereto. In an exemplary embodiment, at least one of both edges of the first trenches T1 and the fourth trenches T4 may be in an exposed state. When at least one of the both edges of the first trenches T1 is exposed, at least one of both edges of the second trenches T2 and the third trenches T3 may also be exposed.

An anode collector 370 that covers the first elastic member 360 may be disposed on the anode active material layer 350.

The deformation of the 3D secondary battery 300 due to the expansion of the anode active material layer 350 in a process of charging the 3D secondary battery 300 may be mitigated by the first elastic member 360 but may further be effectively mitigated by the second elastic member 380.

Other operations of the 3D secondary battery 300 may be substantially the same as that of the 3D secondary battery 100, and thus, the descriptions thereof will be omitted.

The first trenches T1 of the 3D secondary battery 300 may be provided as the shape of the first trenches T1' of the 3D secondary battery 100 of FIG. 3. Also, the fourth trenches T4 may be provided in various shapes as the first trenches T1' of the 3D secondary battery 100 of FIG. 3.

Figure 6:
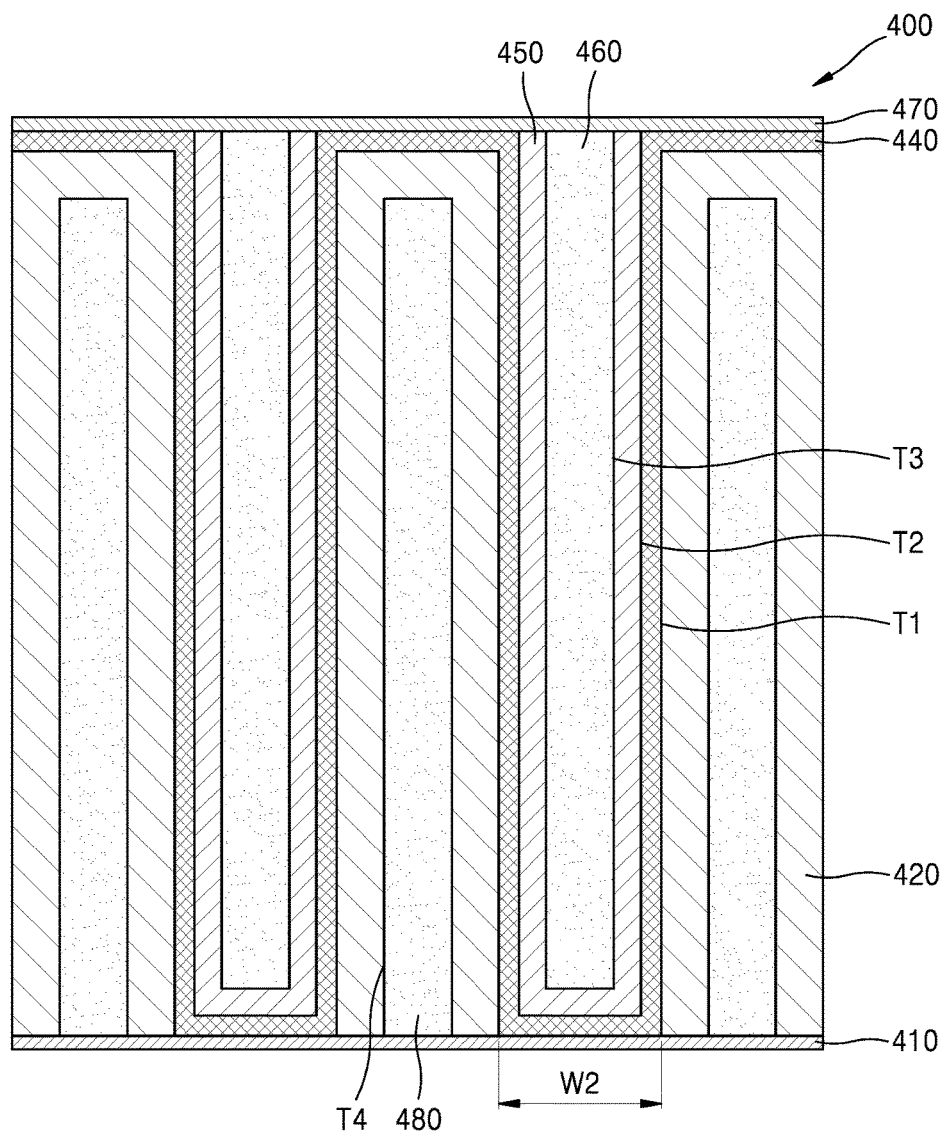
FIG. 6 is a cross-sectional view illustrating a structure of another exemplary embodiment of a 3D secondary battery having elastic members.

FIG. 6 is a cross-sectional view illustrating a structure of a 3D secondary battery 400 including a first elastic member 460 and a second elastic member 480 according to another exemplary embodiment.

Referring to FIG. 6, a plurality of cathode active material plates 420 is disposed on a cathode collector 410. The cathode active material plates 420 may be substantially perpendicularly provided with respect to the cathode collector 410. In an exemplary embodiment, the cathode active material plates 420 adjacent to each other may define a first space having a second width W2 in a range from about 10 μm to about 50 μm therebetween, for example. A fourth trench T4 may be defined in each of the cathode active material plates 420. The fourth trench T4 may be defined to expose the cathode collector 410. Both edges of the fourth trench T4 may be exposed when viewed from a plan view. The fourth trench T4 may be filled with a second elastic member 480. The second elastic member 480 may be provided to contact the cathode collector 410. The fourth trench T4 and the second elastic member 480 may be omitted.

An electrolyte layer 440 may be disposed on the cathode collector 410 to cover the cathode active material plates 420. In an exemplary embodiment, the electrolyte layer 440 may include a solid electrolyte and may be provided to a thickness in a range from about 1 μm to about 5 μm, for example. The electrolyte layer 440 may form a second trench T2 exposed between the adjacent cathode active material plates 420.

An anode active material layer 450 may be disposed on the electrolyte layer 440. In an exemplary embodiment, the anode active material layer 450 may have a thickness in a range from about 50 nm to about 15 μm, for example. A third trench T3 may be provided in the anode active material layer 450.

The third trench T3 of the anode active material layer 450 may be filled with a first elastic member 460 that may absorb expansion of the anode active material layer 450. The first elastic member 460 may include an elastic material.

The first elastic member 460 and the second elastic member 480 may include the same material used to form the elastic member 160 of FIG. 1.

However, the exemplary embodiment is not limited thereto. In an exemplary embodiment, the anode active material layer 450 may be configured of two plates, and the first elastic member 460 may be disposed between the two plates to contact the electrolyte layer 440.

Also, the anode active material layer 450 may be provided to cover the electrolyte layer 440 disposed on an upper surface of the cathode active material plates 420 by forming the anode active material layer 450 using a deposition process or a thermal evaporation process (refer to FIG. 1).

An anode collector 470 that covers the first elastic member 460 may be disposed on the anode active material layer 450.

FIGS. 7A through 7D are cross-sectional views illustrating a method of manufacturing a 3D secondary battery 500 including an elastic member according to an exemplary embodiment.

Figure 7A:
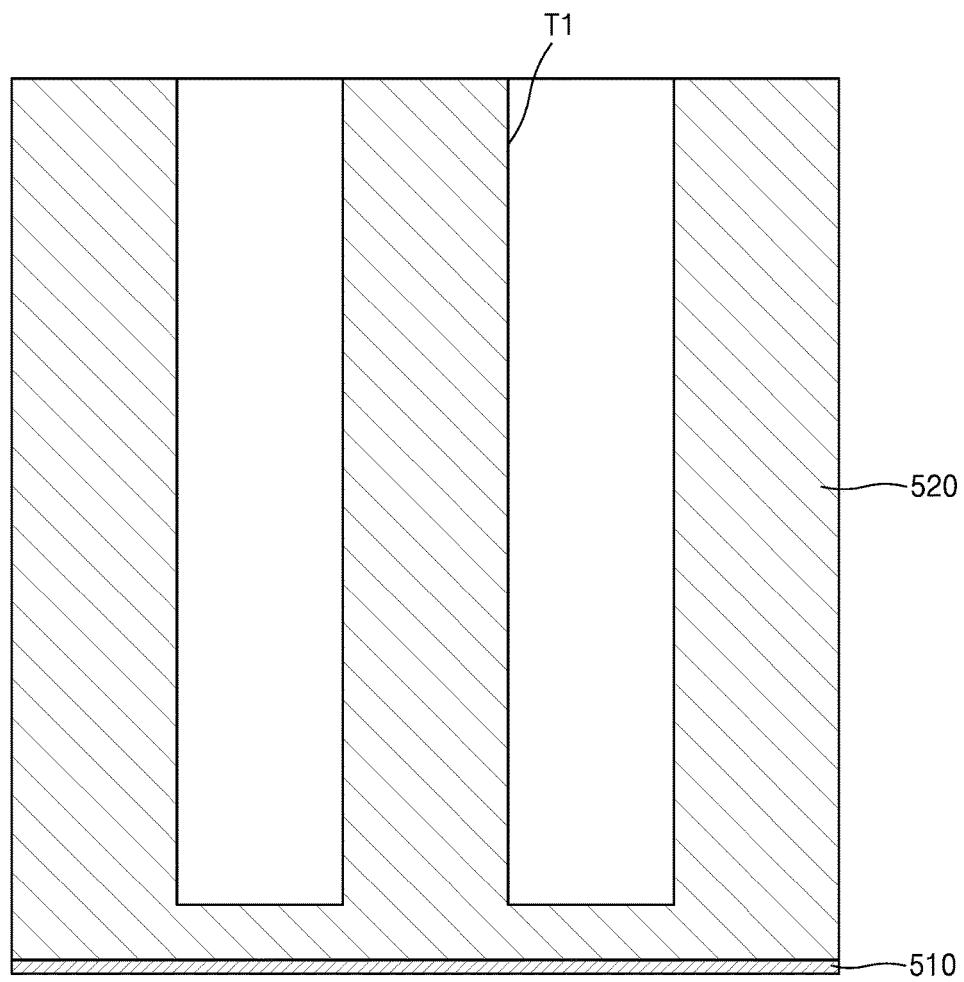
FIGS. 7A through 7D are cross-sectional views illustrating an exemplary embodiment of a method of manufacturing a 3D secondary battery having an elastic member.

Referring to FIG. 7A, a cathode collector 510 is prepared. In an exemplary embodiment, the cathode collector 510 may include a metal thin film, for example. The cathode collector 510 may also be provided by depositing a metal thin film on a substrate (not shown).

A cathode active material layer 520 is disposed on the cathode collector 510. In an exemplary embodiment, the cathode active material layer 520 may be provided by depositing $LiCoO_2$, and annealing the $LiCoO_2$ at a temperature of approximately 550 degrees Celsius (° C.), for example.

First trenches T1 are defined in the cathode active material layer 520. The first trenches T1 may be provided long in a vertical direction as shown in FIG. 7A. The first trenches T1 may be provided in plural (refer to FIG. 3). In an exemplary embodiment, the first trenches T1 may be defined by using a general lithography method, for example.

Figure 7B:
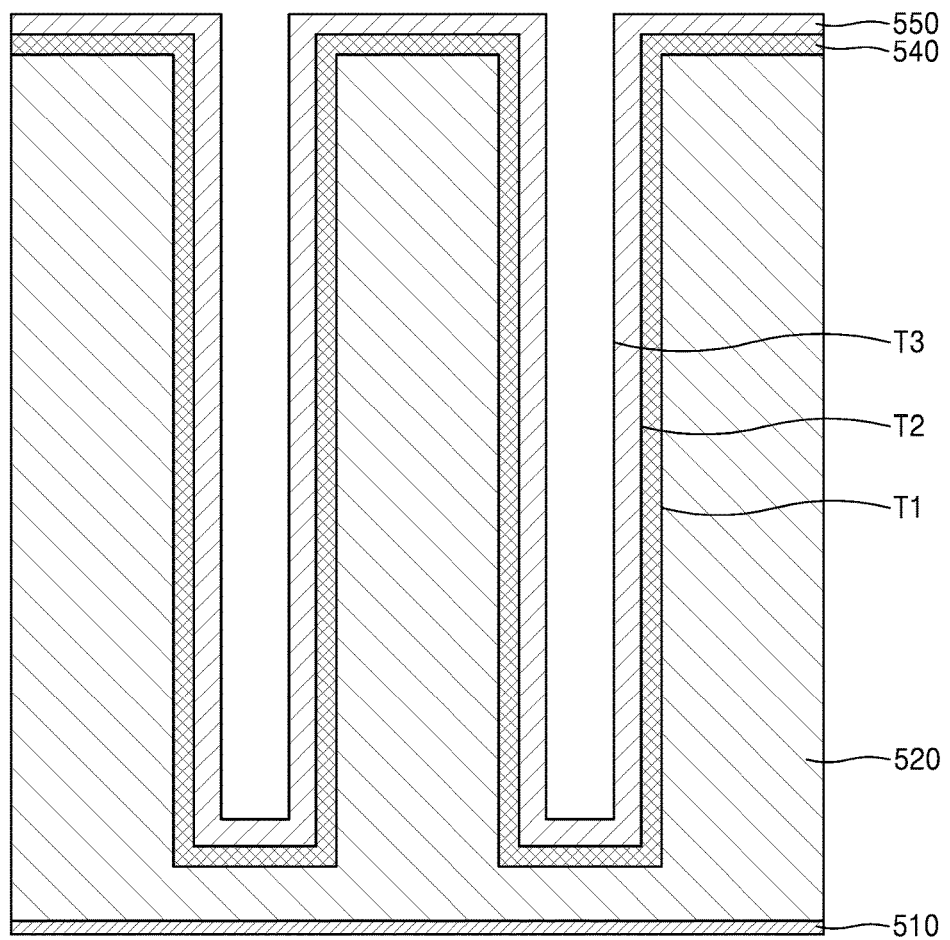

Referring to FIG. 7B, an electrolyte layer 540 is deposited on the cathode active material plates 520. In an exemplary embodiment, the electrolyte layer 540 may include, for example, lithium phosphorous oxynitride (LiPON). In an exemplary embodiment, the electrolyte layer 540 may be provided to a thickness in a range from about 1 μm to about 5 μm by using a physical deposition method or a chemical vapor deposition method, for example. Second trenches T2 having a similar shape to that of the first trenches T1 may be provided in the electrolyte layer 540.

Next, an anode active material layer 550 is disposed on the electrolyte layer 540. In an exemplary embodiment, the anode active material layer 550 may include, for example, a lithium metal. In an exemplary embodiment, the anode active material layer 550 may be provided to a thickness in a range from about 50 nm to about 15 um by using a thermal evaporation method, for example. Third trenches T3 having a similar shape to that of the second trenches T2 may be provided in the anode active material layer 550.

Figure 7C:
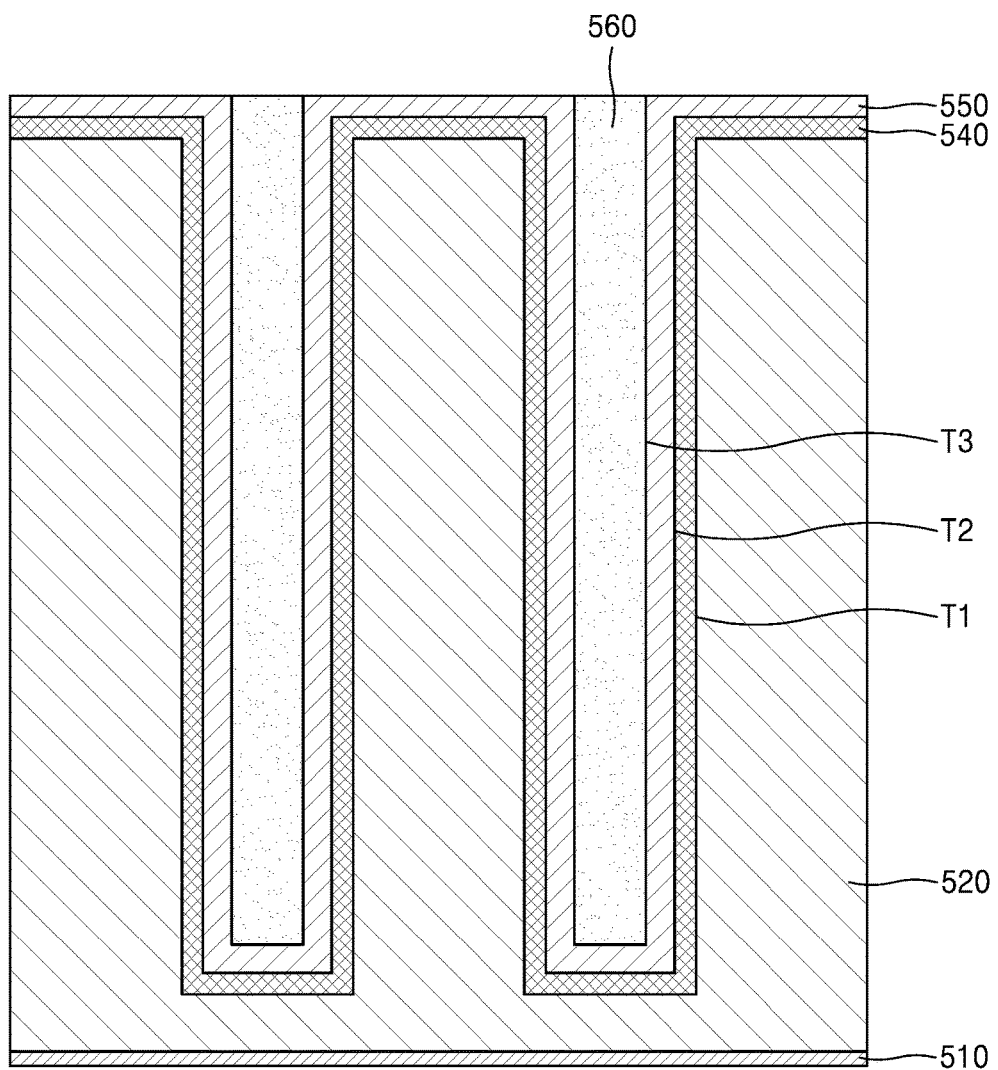

Referring to FIG. 7C, after injecting a monomer in a liquid, emulsion, or gas state into the third trenches T3, a polymer is provided by annealing the monomer, adding an initiator to the monomer, plasma processing the monomer, adding catalyst to the monomer or adding radicals to the monomer. In an exemplary embodiment, after filling the third trenches T3 with dimethylsilanediol as a monomer, polymethysilane rubber may be provided by annealing dimethylsilanediol at a temperature of approximately 80° C., for example.

In an exemplary embodiment, after filling the third trenches T3 with butyl acrylate and adding azobisisobutyronitrile ("AIBN") as an initiator, butyl acrylate copolymer may be provided by annealing butyl acrylate and AIBN at a temperature of approximately 80° C., for example.

In an exemplary embodiment, after filling the third trenches T3 with liquid state silicon rubber and adding Pt as a catalyst, elastomer may be provided by annealing the silicon rubber at a temperature of approximately 80° C., for example.

In a process of manufacturing an elastic member 560, a conduction agent, for example, carbon black, VGCF™, or carbon nanotubes may be impregnated in the first elastic member 560 to increase conductivity of the first elastic member 560.

When both edges of the first through third trenches T1 through T3 are in an exposed state, after closing the both edges of the third trenches T3 with a jig (not shown), the monomer is injected thereto.

Figure 7D:
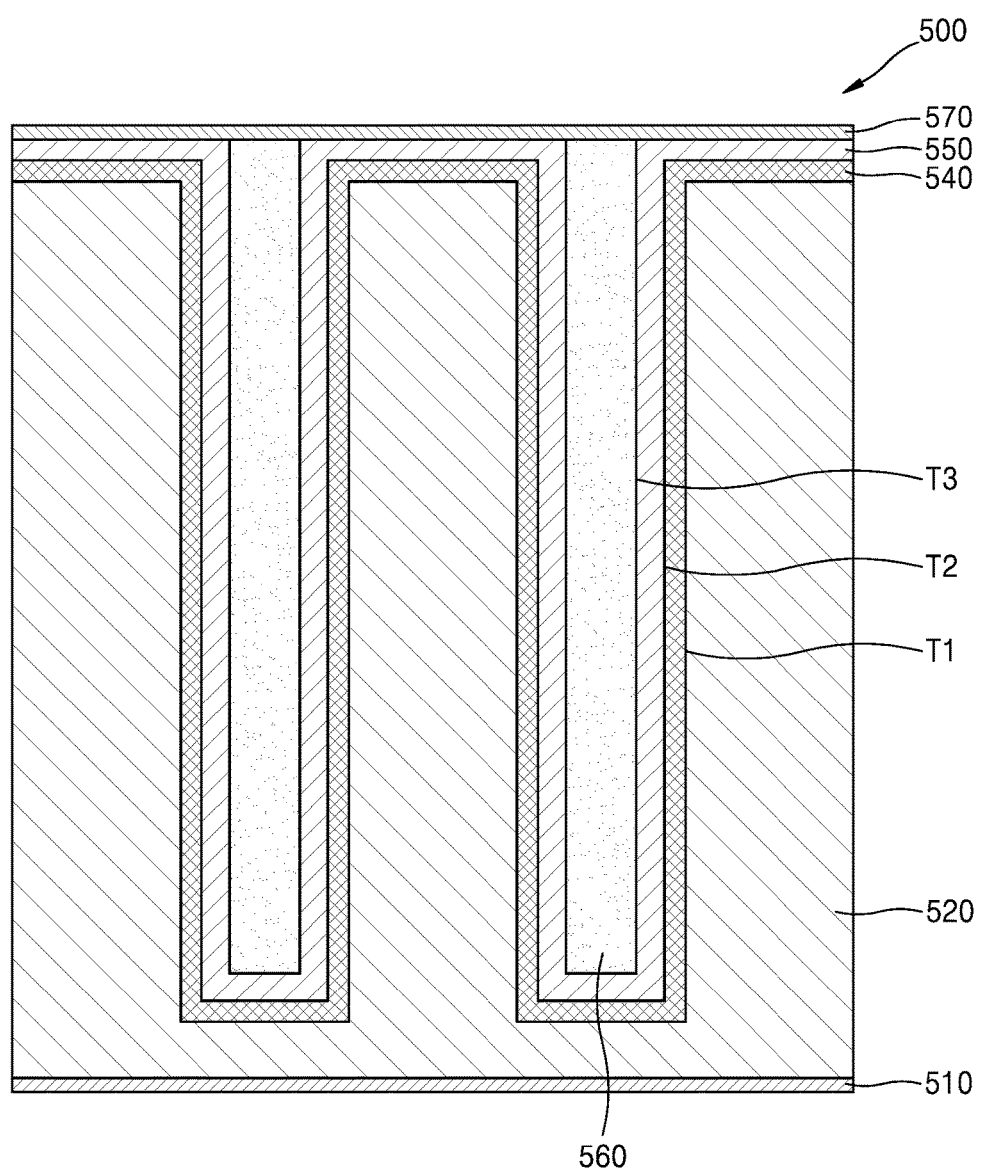

Referring to FIG. 7D, an anode collector 570 is disposed on the anode active material layer 550 to cover the elastic member 560. In an exemplary embodiment, the anode collector 570 may be provided by using a vapor deposition method, for example. In an exemplary embodiment, the anode collector 570 may also include a metal thin film, for example.

As described above, according to the one or more of the above exemplary embodiments, since a 3D secondary battery includes an elastic member that mitigates expansion of an anode active material layer during charging and discharging the 3D secondary battery, deformation and degradation of the 3D secondary battery may be prevented, and as a result, the lifetime of the 3D secondary battery can be increased.

While one or more exemplary embodiments have been described with reference to the figures, it will be understood by those of ordinary skill in the art that various changes in form and details may be made therein without departing from the spirit and scope as defined by the following claims.

What is claimed is:

1. A three dimensional secondary battery comprising:
   a cathode collector;

a cathode active material layer on an upper surface of the cathode collector, the cathode active material layer including a plurality of first trenches on an upper surface thereof;

an electrolyte layer covering the upper surface of the cathode active material layer and an exposed surface of the cathode active material layer by the plurality of first trenches;

an anode active material layer on the electrolyte layer, the anode active material layer including a plurality of second trenches corresponding to the plurality of first trenches;

a plurality of elastic members including at least one of a polymer and a rubber, each filling respective one of the plurality of second trenches; and an anode collector covering the anode active material layer and the plurality of elastic members.

2. The three dimensional secondary battery of claim 1, wherein each of the plurality of elastic members includes at least one of styrene-butadiene rubber ("SBR"), butadiene rubber ("BR"), isoprene rubber ("IR"), ethylene propylene diene monomer ("EPDM") rubber, silicone rubber, alkyl acrylate copolymer ("ACM"), styrene-butadiene copolymer ("SBS"), styrene-ethylene-butadiene-styrene copolymer ("SEBS"), polymethylsilane rubber, and butyl acrylate copolymer.

3. The three dimensional secondary battery of claim 2, wherein each of the plurality of elastic members includes a conduction agent.

4. The three dimensional secondary battery of claim 3, wherein the conduction agent includes at least one of carbon black and carbon nanotubes.

5. The three dimensional secondary battery of claim 1, wherein the anode active material layer includes at least one of lithium metal, silicon, tin, aluminum, and germanium.

6. The three dimensional secondary battery of claim 1, wherein the cathode active material layer further comprises:
   a plurality of third trenches on a surface facing the cathode collector; and
   a plurality of second elastic members that fill respective one of the plurality of third trenches.

7. The three dimensional secondary battery of claim 6, wherein the plurality of first trenches and the plurality of third trenches are alternately provided and are parallel to each other when viewed from a plan view.

8. A three dimensional secondary battery comprising:
   a cathode collector;
   a plurality of cathode active material plates disposed perpendicular to the cathode collector;
   an electrolyte layer on the cathode collector to cover the plurality of cathode active material plates;
   a plurality of anode active material layer, each covering the electrolyte layer between adjacent cathode active material plates to form corresponding one of a plurality of first trenches;
   a plurality of elastic members including at least one of a polymer and a rubber, each filling respective one of the plurality of first trenches; and
   an anode collector that covers the anode active material layer and the plurality of elastic members.

9. The three dimensional secondary battery of claim 8, wherein each of the plurality of elastic members includes at least one of styrene-butadiene rubber ("SBR"), butadiene rubber ("BR"), isoprene rubber ("IR"), ethylene propylene diene monomer ("EPDM") rubber, silicone rubber, alkyl acrylate copolymer ("ACM"), styrene-butadiene copolymer ("SBS"), styrene-ethylene-butadiene-styrene copolymer ("SEBS"), polymethylsilane rubber, and butyl acrylate copolymer.

10. The three dimensional secondary battery of claim 9, wherein each of the plurality of elastic members includes a conduction agent.

11. The three dimensional secondary battery of claim 10, wherein the conduction agent includes at least one of carbon black and carbon nanotubes.

12. The three dimensional secondary battery of claim 8, wherein the anode active material layer includes at least one of lithium metal, silicon, tin, aluminum, and germanium.

13. The three dimensional secondary battery of claim 8, wherein the cathode active material plates further comprise:
   a plurality of second trenches disposed on a surface facing the cathode collector; and
   a plurality of second elastic members, each filling respective one of the plurality of second trenches.

14. The three dimensional secondary battery of claim 13, wherein a plurality of third trenches is defined in the cathode active material layer, and
   wherein the plurality of first trenches and the plurality of third trenches are alternately provided and are parallel to each other when viewed from a plan view.

15. A method of manufacturing a three dimensional secondary battery, the method comprising:
   preparing a cathode collector;
   forming a cathode active material layer on the cathode collector;
   forming a plurality of first trenches on an upper surface of the cathode active material layer;
   sequentially forming an electrolyte layer and an anode active material layer in the plurality of first trenches and on the cathode active material layer to form a plurality of second trenches in the anode active material layer, each of the plurality of second trenches corresponding to respective one of the plurality of first trenches;
   filling each of the plurality of second trenches with respective one of the plurality of elastic members including at least one of a polymer and a rubber; and
   forming an anode collector on the anode active material layer to cover the plurality of elastic members.

16. The method of claim 15, wherein the filling each of the plurality of second trenches with the elastic member comprises:
   filling each of the plurality of second trenches with a monomer; and
   polymerizing the monomer.

17. The method of claim 16, wherein the filling each of the plurality of second trenches with the monomer further comprises adding at least one of an initiator, a catalyst, and a radical to the monomer.

18. The method of claim 16, wherein the filling each of the plurality of second trenches with the monomer further comprises adding a conduction agent to the monomer.

19. The method of claim 15, wherein the elastic member includes at least one of styrene-butadiene rubber ("SBR"), butadiene rubber ("BR"), isoprene rubber ("IR"), ethylene propylene diene monomer ("EPDM") rubber, silicone rubber, alkyl acrylate copolymer ("ACM"), styrene-butadiene copolymer ("SBS"), styrene-ethylene-butadiene-styrene copolymer ("SEBS"), polymethylsilane rubber, and butyl acrylate copolymer.

20. The method of claim 15, wherein the anode active material layer includes at least one of lithium metal, silicon, tin, aluminum, and germanium.

\* \* \* \* \*